United States Patent [19]

Sato et al.

[11] Patent Number: 5,105,265
[45] Date of Patent: Apr. 14, 1992

[54] PROJECTOR APPARATUS HAVING THREE LIQUID CRYSTAL PANELS

[75] Inventors: Makoto Sato; Masahiro Ogawa, both of Tokyo, Japan

[73] Assignee: Casio Computer Co., Ltd., Tokyo, Japan

[21] Appl. No.: 300,078

[22] Filed: Jan. 19, 1989

[30] Foreign Application Priority Data

Jan. 25, 1988 [JP] Japan .................................. 63-7068
Jan. 25, 1988 [JP] Japan .................................. 63-7069
Jan. 28, 1988 [JP] Japan .................................. 63-8818

[51] Int. Cl.⁵ .......................... H04N 9/31; H04N 9/30
[52] U.S. Cl. ................................ 358/60; 358/61; 353/31; 353/34; 359/40; 359/634; 359/637
[58] Field of Search ............. 358/60, 61, 62, 63, 358/231, 230; 350/171, 172, 173, 174, 394, 397, 398, 331 R, 445, 452, 401, 402, 403; 353/31, 34

[56] References Cited

U.S. PATENT DOCUMENTS

| | | |
|---|---|---|
| 3,588,324 | 6/1971 | Marie ................................. 358/61 |
| 4,191,456 | 3/1980 | Hong et al. ........................ 350/173 |
| 4,796,978 | 1/1989 | Tanaka et al. ..................... 35/337 |
| 4,850,685 | 7/1989 | Kamakura et al. ................ 350/174 |
| 4,864,390 | 9/1989 | McKechnie et al. ............. 358/60 |
| 4,904,061 | 2/1990 | Aruga ................................ 350/331 |
| 4,909,601 | 3/1990 | Yajima et al. .................... 35/331 R |
| 4,935,758 | 6/1990 | Miyatake et al. ................. 353/31 |
| 4,936,658 | 6/1990 | Tanaka et al. .................... 350/337 |
| 4,943,154 | 7/1990 | Miyatake et al. ................. 353/31 |
| 4,962,997 | 10/1990 | Baldwin ........................... 350/172 |

FOREIGN PATENT DOCUMENTS 0331326 9/1989 European Pat. Off. .
0196192 8/1988 Japan .

Primary Examiner—James J. Groody
Assistant Examiner—Safet Metjahic
Attorney, Agent, or Firm—Frishauf, Holtz, Goodman & Woodward

[57] ABSTRACT

All of first to third liquid crystal panels have the same structure. A plurality of dichroic mirrors separate light from a light source into the three primary color (red, green, and blue) beams, and cause the red, green, and blue beams to be respectively incident on the first, second, and the third liquid crystal panels. A dichroic prism superposes the red, green, and blue beams which are respectively transmitted through the liquid crystal panels. A projection lens projects a full-color image beam formed by the dichroic prism. Correcting devices are respectively arranged to oppose the incident surfaces of the first to third liquid crystal panels, and cause the respective color beams separated by the dichroic mirrors to be incident as beams in which the intensities of light components oscillating in the same direction are high.

22 Claims, 6 Drawing Sheets

PROJECTOR APPARATUS HAVING THREE LIQUID CRYSTAL PANELS

BACKGROUND OF THE INVENTION

1. Field of the Invention

This invention relates to a liquid crystal projector and, more particularly, to a liquid crystal projector for projecting/displaying a full-color image on a screen.

2. Description of the Related Art

A projector for enlarging an image displayed on a liquid crystal panel and projecting/displaying the enlarged image on a screen by using a projection lens has been recently developed as a liquid crystal projector for displaying a television image and the like by using a liquid crystal panel. In a liquid crystal projector of this type, an image displayed on a liquid crystal panel is enlarged and displayed on a screen. Therefore, if a liquid crystal panel for displaying a full-color image by combining three primary color pixels, i.e., red, green, and blue pixels, is used, an image enlarged/projected onto the screen becomes a low-resolution image in which red, green, and blue pixels are undesirably conspicuous.

A liquid crystal projector comprising three liquid crystal panels, namely, first, second, and third panels, therefore, has been proposed as the above-described projection type liquid crystal projector. In this liquid crystal projector, the first liquid crystal panel displays a first color image of the three primary color (red, green, and blue) images, and the second and third liquid crystal panels respectively display second and third color images. With this arrangement, a full-color image beam is formed by superposing red, green, and blue image beams transmitted through the respective liquid crystal panels, and is projected on the screen. According to this projector, since each pixel of a full-color image projected on the screen is a full-color image obtained by superposing red, green, and blue pixels, the quality of an image projected on the screen can be greatly improved as compared with the projector in which a full-color image projected on the screen consists of red, green, and blue pixels alternately displayed on a single display panel.

According to a known liquid crystal projector of this projection type, the liquid crystal panels respectively comprise red, green, and blue color filters, and light sources are arranged for the respective liquid crystal panels. Since this projector requires three light sources, the cost is increased, and moreover, power consumption becomes high. For this reason, a system using a single light source has been recently studied. In this system, a beam from this light source is separated by a dichroic mirror into three primary color (red, green, and blue) beams, and the obtained first, second, and third color beams are respectively caused to be incident on first, second, and third liquid crystal panels.

FIG. 5 shows a conventional projection type liquid crystal projector in which a beam from a single light source is separated into three primary color (red, green, and blue) beams so as to be respectively incident on three liquid crystal panels, and a full-color image beam formed by superposing the beams transmitted through the respective liquid crystal panels is projected on a screen.

Referring to FIG. 5, reference numeral 1 denotes a projection unit of the projector. Projection lens 2 is arranged at the front surface of unit 1.

Reference symbol 3R denotes a liquid crystal panel for displaying a red image (to be referred to as a red image display liquid crystal panel hereinafter); 3G, a liquid crystal panel for displaying a green image (to be referred to as a green image display liquid crystal panel hereinafter) and 3B, a liquid crystal panel for displaying a blue image (to be referred to as a blue image display liquid crystal panel hereinafter).

Liquid crystal panels 3R, 3G, and 3B respectively comprise incident beam polarizing plates 4 on their incident surfaces and image forming polarizing plates 5 on their output surfaces. In addition, the liquid crystal in each liquid crystal panel is twisted/aligned at about 90° or 270° with respect to the polarizing axis of incident beam polarizing plate 4, thereby constituting a TN (twisted nematic) type liquid crystal panel.

Each image forming polarizing plate 5 is arranged such that its polarizing axis is parallel or perpendicular to the polarizing axis of corresponding incident beam polarizing plate 4.

Liquid crystal panels 3R, 3G, and 3B have the same pixel arrangement, and respectively display images of red, green, and blue color components of a single full-color image. One of liquid crystal panels 3R, 3G, and 3B, e.g., green image display liquid crystal panel 3G, is arranged such that its output surface opposes projection lens 2.

Reference numeral 6 denotes an image mixing dichroic prism arranged between liquid crystal panel 3G and projection lens 2. The other two liquid crystal panels, i.e., red and blue image display liquid crystal panels 3R and 3B, are arranged such that their output surfaces oppose both side surfaces of dichroic prism 6.

Reference numeral 7 denotes a light source for emitting beams onto liquid crystal panels 3R, 3G, and 3B. Light source 7 opposes green image display liquid crystal panel 3G, which opposes projection lens 2 through dichroic prism 6, of liquid crystal panels 3R, 3G, and 3B. Light source 7 comprises a light source lamp and a reflector for reflecting light emitted from the light source lamp toward liquid crystal panel 3G. A parabolic mirror reflector, for reflecting light emitted from the light source lamp as a collimated beam, is used as the reflector.

Reference symbols 8a and 8b denote two dichroic mirrors combined in an X shape and arranged between light source 7 and liquid crystal panel 3G. Dichroic mirror 8a serves as a red beam separating mirror for reflecting a beam having a red color component wavelength and transmitting beams having other wavelengths. Dichroic mirror 8b serves as a blue beam separating mirror for reflecting a beam having a blue color component wavelength and transmitting beams having other wavelengths. Two dichroic mirrors 8a and 8b separate light emitted from light source 7 into the three primary color (red, green, and blue) beams.

Of light emitted from light source 7, a beam having a green color component wavelength is transmitted through both dichroic mirrors 8a and 8b to be separated. A beam having a red color component wavelength is transmitted through blue beam separating dichroic mirror 8b and is reflected by red beam separating dichroic mirror 8a so as to be separated. A beam having a blue color component wavelength is transmitted through dichroic mirror 8a and is reflected by dichroic mirror 8b so as to be separated.

Green beam G of the red, green, and blue beams separated by dichroic mirrors 8a and 8b is directly incident on green image display liquid crystal panel 3G. Red and blue beams R and B are sequentially reflected by two pairs of reflecting mirrors 9a and 9b, and 10a and 10b so as to be incident on red and blue image display liquid crystal panels 3R and 3B, respectively.

Image mixing dichroic prism 6 mixes the beams transmitted through liquid crystal panels 3R, 3G, and 3B and image forming polarizing plates 5 arranged on their output surfaces, i.e., the red, green, and blue image beams, to form a single image beam. The green image beam incident on dichroic prism 6 from its front surface side propagates straight through dichroic prism 6. The red and blue image beams incident on dichroic prism 6 on both its sides are refracted by dichroic prism 6 in the same direction as that of the green image beam. With this operation, dichroic prism 6 mixes three color image beams to form a single image beam, i.e., a full-color image beam in which the red, green, and blue image beams are superposed on each other. This full-color image beam is projected on screen SC arranged in front of projection lens 2.

More specifically, in this projection type liquid crystal projector, light from single light source 7 is separated into three primary color (red, green, and blue) beams by dichroic mirrors 8a and 8b, the red, green, and blue beams are respectively caused to be incident on red, green, and blue display liquid crystal panels 3R, 3G, and 3B, a full-color image beam is formed by superposing the red, green, and blue beams transmitted through liquid crystal panels 3R, 3G, and 3B by using dichroic prism 6, and the full-color image beam is enlarged and projected on screen SC by using projection lens 2. According to this projection type liquid crystal projector, three liquid crystal panels can be used with a single light source. In addition, since colored beams, i.e., red, green, and blue beams, are incident on liquid crystal panels 3R, 3G, and 3B, no color filter is required for each liquid crystal panel.

In the above-described projection type liquid crystal projector, however, green beam G of the three primary color (red, green, and blue) beams separated by dichroic mirrors 8a and 8b is directly incident on green image display liquid crystal panel 3G, whereas red and blue beams R and B are sequentially reflected by reflecting mirrors 9a and 9b, and 10a and 10b so as to be respectively incident on red and blue image display liquid crystal panels 3R and 3B. As a result, the polarization axis direction of green beam G incident on liquid crystal panel 3G and that of red and blue beams R and B respectively incident on liquid crystal panels 3R and 3B differ from each other. For this reason, in order to efficiently cause beams to be incident on liquid crystal panels 3R, 3G, and 3B, the polarizing axis of polarizing plate 4 and the alignment direction of the liquid crystal for liquid crystal panel 3G must differ from those for liquid crystal panels 3R and 3B.

As described above, beams incident on liquid crystal panels 3R, 3G, and 3B become beams having different polarization axis directions because of the polarization effects of dichroic mirrors 8a and 8b and reflecting mirrors 9a, 9b, 10a, and 10b. Of beams transmitted through dichroic mirrors 8a and 8b, P-polarized light components which are oscillated in a direction perpendicular to the optical axis on surfaces (parallel to the surface of the drawing) perpendicular to the surfaces of dichroic mirrors 8a and 8b and parallel to their tilt directions are subjected to almost no attenuation, and hence are transmitted through dichroic mirrors 8a and 8b at high transmittance. In contrast to this, S-polarized light components which are oscillated in a direction perpendicular to the optical axis on surfaces (perpendicular to the surface of the drawing) perpendicular to the tilt directions of dichroic mirrors 8a and 8b are attenuated to some extent when they are transmitted through dichroic mirrors 8a and 8b. Therefore, a beam transmitted through each dichroic mirror has a P-polarized light component with a high intensity.

Note that the transmittance ratio of a P-polarized light component to an S-polarized light component of a beam transmitted through a single dichroic mirror varies depending on the material of the dichroic mirror, the wavelength of the beam, and the like. For example, it is 10:9. In contrast to a beam transmitted through the dichroic mirror, in a beam reflected by the dichroic mirror, an S-polarized light component is reflected at a high reflectivity, and a P-polarized light component is attenuated to some extent. As a result, the beam reflected by the dichroic mirror has an S-polarized light component with a high intensity (in this case, the reflectivity ratio of the S-polarized light component to the P-polarized light component is, for example, about 10:9).

Similarly, in a beam reflected by a light reflecting mirror, an S-polarized light component is reflected at a high reflectivity, whereas a P-polarized light component is attenuated to a certain extent. Therefore, the beam reflected by the light reflecting mirror also has an S-polarized light component with a high intensity, though this effect is not so noticeable as with the dichroic mirror.

In the conventional projection type liquid crystal projector, therefore, when green beam G incident on liquid crystal panel 3G is transmitted through two dichroic mirrors 8a and 8b, its S-polarized light component is attenuated twice. Red and blue beams R and B incident on liquid crystal panels 3R and 3B are transmitted through one of dichroic mirrors 8a and 8b and are reflected by the other thereof. As a result, red and blue beams R and B separated by dichroic mirrors 8a and 8b have S- and P-polarized light components with substantially equal intensities. However, since red and blue beams R and B are respectively reflected by two pairs of reflecting mirrors 9a and 9b, and 10a and 10b and are incident on liquid crystal panels 3R and 3B, their P-polarized light components are greatly attenuated.

For this reason, in the conventional projector, a panel using a P-polarized light component (in which the polarization axis direction of incident light polarizing plate 4 is matched with the oscillating direction of the P-polarized beam and its liquid crystal is twist-aligned with respect to the polarization axis direction of polarizing plate 4) is used as green image display liquid crystal panel 3G on which green beam G whose S-polarized light component is attenuated twice through two dichroic mirrors 8a and 8b is incident. In addition, panels each using an S-polarized light component (in which the polarization axis direction of polarizing plate 4 is matched with the oscillating direction of an S-polarized beam and its liquid crystal is twist-aligned with respect to the polarization axis direction of polarizing plate 4) are respectively used as red and blue image display liquid crystal panels on which red and blue beams R and B, in which P-polarized light components are greatly attenuated after they are separated by dichroic mirrors 8a and 8b and are reflected by reflecting mirrors 9a, 9b, 10a, and 10b, are incident. This arrangement enables efficient incidence of beams on liquid crystal panels 3R, 3G, and 3B. However, this arrangement requires a single liquid crystal panel using P-polarized light components and two liquid crystal panels using S-polarized light components, and hence two types of panels must be manufactured.

In addition, in the conventional projection type liquid crystal projector, red and blue beams R and B which are incident on liquid crystal panels 3R and 3B from light source 7 have substantially the same optical path length. However, green beam G incident on liquid crystal panel 3G has a shorter optical path length than red and blue beams R and B. As a result, the intensity of green beam G incident on liquid crystal panel G differs from the intensities of red and blue beams R and B incident on liquid crystal panels 3R and 3B. Thus, a full-color image projected on screen SC has a poor color balance.

This phenomenon occurs because red, green, and blue beams, which are incident on liquid crystal panels 3R, 3G, and 3B, diverge. More specifically, if light from light source 7 is perfectly collimated, the illuminance per unit area of each of red, green, and blue beams incident on liquid crystal panels 3R, 3G, and 3B is kept unchanged from the illuminance at the time when it is separated by dichroic mirrors 8a and 8b. In practice, however, light from light source 7 is not perfectly collimated and hence propagates while diverging to some extent, even though the reflector of light source 7 is a parabolic mirror reflector. Therefore, as an optical path from light source 7 increases in length, beams diverge widely. For this reason, if the optical path lengths from light source 7 to liquid crystal panels 3R, 3G, and 3B are different from each other as in the conventional projection type liquid crystal projector, red and blue beams R and B which are respectively incident on liquid crystal panels 3R and 3B diverge more than green beam G which is incident on liquid crystal panel 3G having a shorter optical path from light source 7 than liquid crystal panels 3R and 3B. As a result, the illuminance per unit area of beams incident on liquid crystal panels 3R and 3B is decreased, and the intensities of the beams incident on these panels are also decreased. Therefore, in each beam of the red, green, and blue beams transmitted through liquid crystal panels 3R, 3G, and 3B, the intensity of the green beam is higher than the intensities of the red and blue beams. Consequently, a full-color image beam projected on screen SC has a poor color balance, in which green has a high saturation level and red and blue have low saturation levels.

The above-described projection type liquid crystal projector includes a projector for projecting an image on an external screen and a rear-projection type projector in which a transmission type screen is arranged in front of the projector, and display images from incorporated liquid crystal panels are projected on the transmission type screen from its rear surface side so that an image projected on the screen can be viewed from the front surface side. In the latter rear-projection type liquid crystal projector, an image beam which is transmitted through a projection lens is reflected by a projection mirror and is projected on a screen in order to decrease the depth of the projector.

FIG. 6 shows a conventional rear-projection type liquid crystal projector in which light from a single light source is separated into three primary color beams so as to be respectively incident on three liquid crystal panels, and a full-color image beam formed by superposing beams transmitted through these liquid crystal panels on each other is projected on a transmission type screen arranged in front of the projector.

Referring to FIG. 6, reference numeral 11 denotes a case. A display window is formed in the front surface of case 11. Transmission type screen 12 is arranged on the display window. Transmission type screen 12 is designed such that a plurality of vertical or horizontal (vertical in FIG. 6) stripe lens portions each having a small width are parallel formed on a surface of a transparent sheet made of, e.g., an acrylic resin so as to constitute lenticular lens 13.

Projection unit 1 having the same arrangement as that shown in FIG. 5 is housed in case 11.

Reference numerals 15 and 16 denote projection mirrors. A projection beam (full-color image) from projection unit 1 is reflected by first projection mirror 15 toward second projection mirror 16, and is further reflected by second projection mirror 16 toward screen 12.

That is, this rear-projection type liquid crystal projector is designed to project a full-color image beam from projection unit 1, which is obtained in the same manner as described with reference to FIG. 5, on transmission type screen 12 in front of case 11 through projection mirrors 15 and 16.

According to this projector, therefore, an image beam projected by projection lens 2 is projected on screen 12 through an optical path which is bent by projection mirrors 15 and 16. This arrangement can decrease the depth of the projector as compared with the system in which a projection lens is arranged to directly oppose a screen.

In the rear-projection type liquid crystal projector which employs the system of projecting an image beam projected from projection lens 2 on screen 12 by reflecting the image beam using projection mirrors 15 and 16 so as to decrease the depth of the projector, however, the poor color balance of the full-color image beam projected on screen 12, which is caused by projection unit 1 shown in FIG. 6, is further degraded even if a panel using a P-polarized light component is used as green image display liquid crystal panel 3G, and panels using S-polarized light components are respectively used as red and blue image display liquid crystal panels 3R and 3B. This is because, similar to light reflecting mirrors 9a, 9b, 10a, and 10b described above, projection mirrors 15 and 16 reflect an S-polarized light component at a high reflectivity, but reflect a P-polarized light component at a low reflectivity. Therefore, for example, if the polarization axis direction of image forming polarizing plates 5 arranged on the output surfaces of liquid crystal panels 3R, 3G, and 3B is parallel to that of incident light polarizing plates 4 (the oscillating direction of an image beam transmitted through each polarizing plate 5 coincides with that of a beam incident on a corresponding liquid crystal panel), a green image beam which is a P-polarized beam is attenuated every time it is reflected by projection mirrors 15 and 16. As a result, the poor color balance of the full-color image beam projected on screen 12 caused by projection unit 1 in FIG. 6, in which the saturation level of green is low, is further degraded. In contrast to this, assume that the polarization axis direction of image forming polarizing plates 5 of liquid crystal panels 3R, 3G, and 3B is set to be perpendicular to the polarization axis direction of incident light polarizing plates 4 (the oscillating direction of an image beam transmitted through each polarizing plate 5 is perpendicular to that of a beam incident on a corresponding liquid crystal panel). In this case, a green image beam becomes an S-polarized beam, but red and blue image beams become P-polarized beams. Therefore, the red and blue image beams are attenuated every time they are reflected by projection mirrors 15 and 16. As a result, the poor color balance of the full-color image beam projected on screen 12, which is caused by projection unit 1 itself in FIG. 6, is further degraded.

In addition, according to the rear-projection type liquid crystal projector shown in FIG. 6, lenticular lens 13 having a plurality of stripe lens portions each having a small width is formed on the front surface of the transmission type screen so that an image beam transmitted through screen 12 from its rear surface side to its front surface side is spread by lenticular lens 13 so as to increase the viewing angle of an image projected on screen 12.

In the rear-projection type liquid crystal projector comprising transmission type screen 12 having lenticular lens 13 formed on its surface so as to increase the viewing angle of an image projected thereon, however, if a panel using a P-polarized light component is used as green image display liquid crystal panel 3G, and panels using S-polarized light components are respectively used as red and blue image display liquid crystal panels 3R and 3B, the transmittance of a green image beam or red and blue image beams of a full-color image beam projected on screen 12 is decreased, and the poor color balance of a full-color image beam projected on screen 12, which is caused by projection unit 1 in FIG. 6, is further degraded. This degradation is caused by surface reflection of lenticular lens 13 on the surface of screen 12. Of beams incident on the lens portions of lenticular lens 13 on screen 12, a beam oscillated in the widthwise direction of the lens portions is reflected at the lowest reflectivity, whereas a beam oscillated in the longitudinal direction of the lens portions is reflected at the highest reflectivity. If a panel using a P-polarized light component is used as liquid crystal panel 3G, and panels using S-polarized light components are respectively used as liquid crystal panels 3R and 3B, the oscillating direction of a green image beam transmitted through liquid crystal panel 3G becomes perpendicular to that of red and blue image beams transmitted through liquid crystal panels 3R and 3B. Therefore, if the lens portions of lenticular lens 13 on the surface of screen 12 are, for example, stripe lens portions aligned in a direction perpendicular to the oscillating direction of the red and blue image beams, the red and blue image beams are transmitted through the rear surface to the front surface of screen 12 at a high transmittance, but the green image beam which is oscillated in a direction parallel to the longitudinal direction of the lens portions is transmitted through screen 12 at a low transmittance because it has a high reflectivity at the lens portion surface. As a result, the poor color balance of the full-color image beam projected on screen 12 caused by projection unit 1 itself in FIG. 6, in which the saturation level of a green beam is low, is further degraded. In contrast to this, if the stripe lens portions of lenticular lens 13 are arranged in a direction perpendicular to the oscillating direction of a green image beam, a full-color image projected on screen 12 becomes an image in which the saturation levels of red and blue beams are low.

SUMMARY OF THE INVENTION

It is, therefore an object of the present invention to provide a new and improved liquid crystal projector which is designed to separate light from a single light source into three primary color (red, green, and blue) beams, form a full-color image beam by causing the color beams to be respectively incident on three TN type liquid crystal panels and superposing the red, green, and blue beams transmitted through the respective liquid crystal panels, and project the full-color image beam on a screen by using a projection lens, and which can form a high-quality full-color image beam on the screen, in which the saturation levels of red, green, and blue are balanced, while all three TN type liquid crystal panels are constituted by identical liquid crystal panels.

It is another object of the present invention to provide a rear-projection type liquid crystal projector which is designed to separate light from a single light source into three primary color (red, green, and blue) beams, form a full-color image beam by causing the beams to be respectively incident on three TN type liquid crystal panels and superposing the red, green, and blue beams transmitted through the respective liquid crystal panels, and project the full-color image on a transmission type screen in front of a case by using a projection lens, and which can form a high-quality full-color image beam on the screen, in which the saturation levels of red, green, and blue beams are balanced.

It is still another object of the present invention to provide a rear-projection type liquid crystal projector which is designed to separate light from a single light source into three primary color (red, green, and blue) beams, form a full-color image beam by causing the beams to be respectively incident on three TN type liquid crystal panels and superposing the red, green, and blue beams transmitted through the respective liquid crystal panels, and project the full-color image beam on a transmission type screen having a lenticular lens formed on its surface by using a projection lens, and which can form a high-quality full-color image transmitted through the screen to its surface side, in which the saturation levels of red, green, and blue beams are balanced.

According to one aspect of the present invention, there is provided a liquid crystal projector comprising:

first to third liquid crystal panels having the same structure;

a light source;

a plurality of dichroic mirrors for separating light from the light source into three primary color beams, i.e., red, green, and blue beams, and causing the red, green, and blue beams to be respectively incident on the first, second, and third liquid crystal panels;

a dichroic prism for superposing the red, green, and blue beams which are respectively transmitted through the liquid crystal panels;

a projection lens for projecting a full-color image beam formed by the dichroic prism; and correcting means, respectively arranged to oppose incident surfaces of the first to third liquid crystal panels, for causing the respective color beams, which are separated by the plurality of dichroic mirrors, to be incident as beams in which intensities of light components oscillating in the same direction are high.

BRIEF DESCRIPTION OF THE DRAWINGS

These and other objects and features of the present invention can be understood through the following embodiments by reference to the accompanying drawings, in which.

DETAILED DESCRIPTION OF THE PREFERRED EMBODIMENTS

A first embodiment will be described below with reference to FIGS. 1 and 2.

Figure 1:
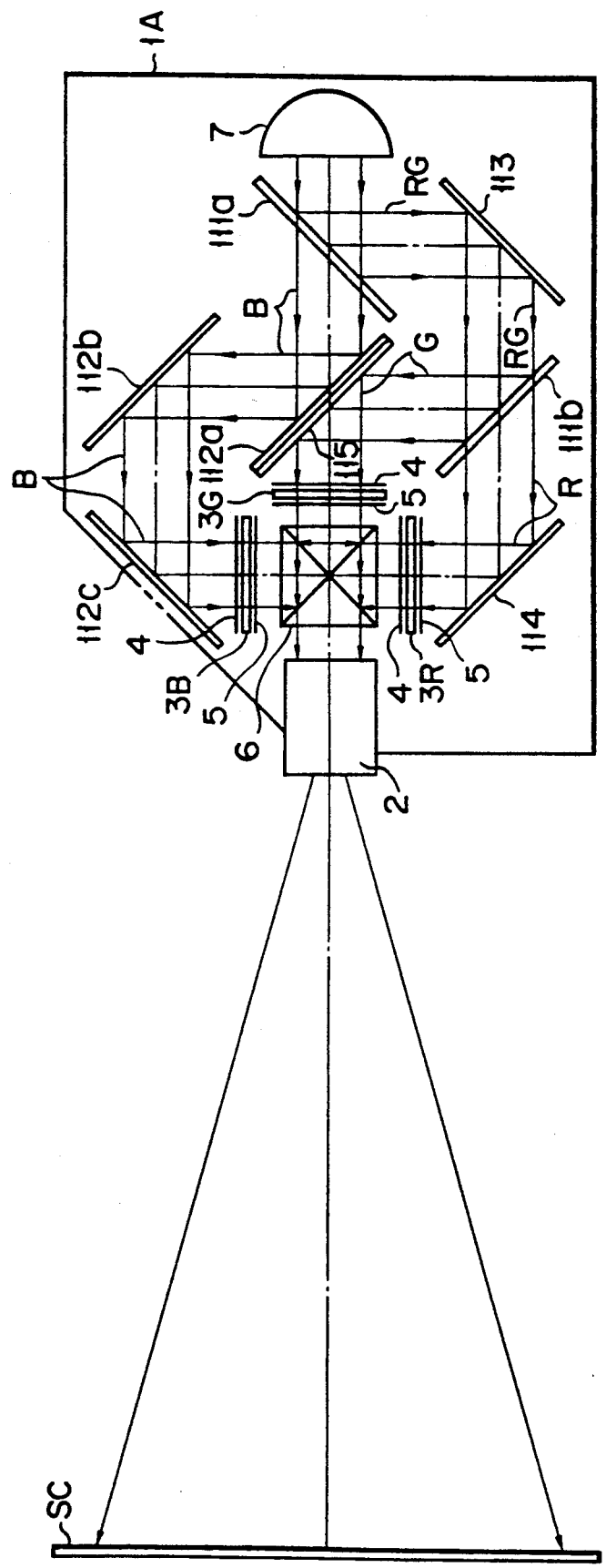
FIGS. 1 and 2 are a longitudinal side view showing a projection type liquid crystal projector according to a first embodiment of the present invention, and an enlarged view showing a projector system thereof.

FIG. 1 shows an overall arrangement of a liquid crystal projector (projector). FIG. 2 is an enlarged view showing a projection system in the projector main body.

Figure 2:
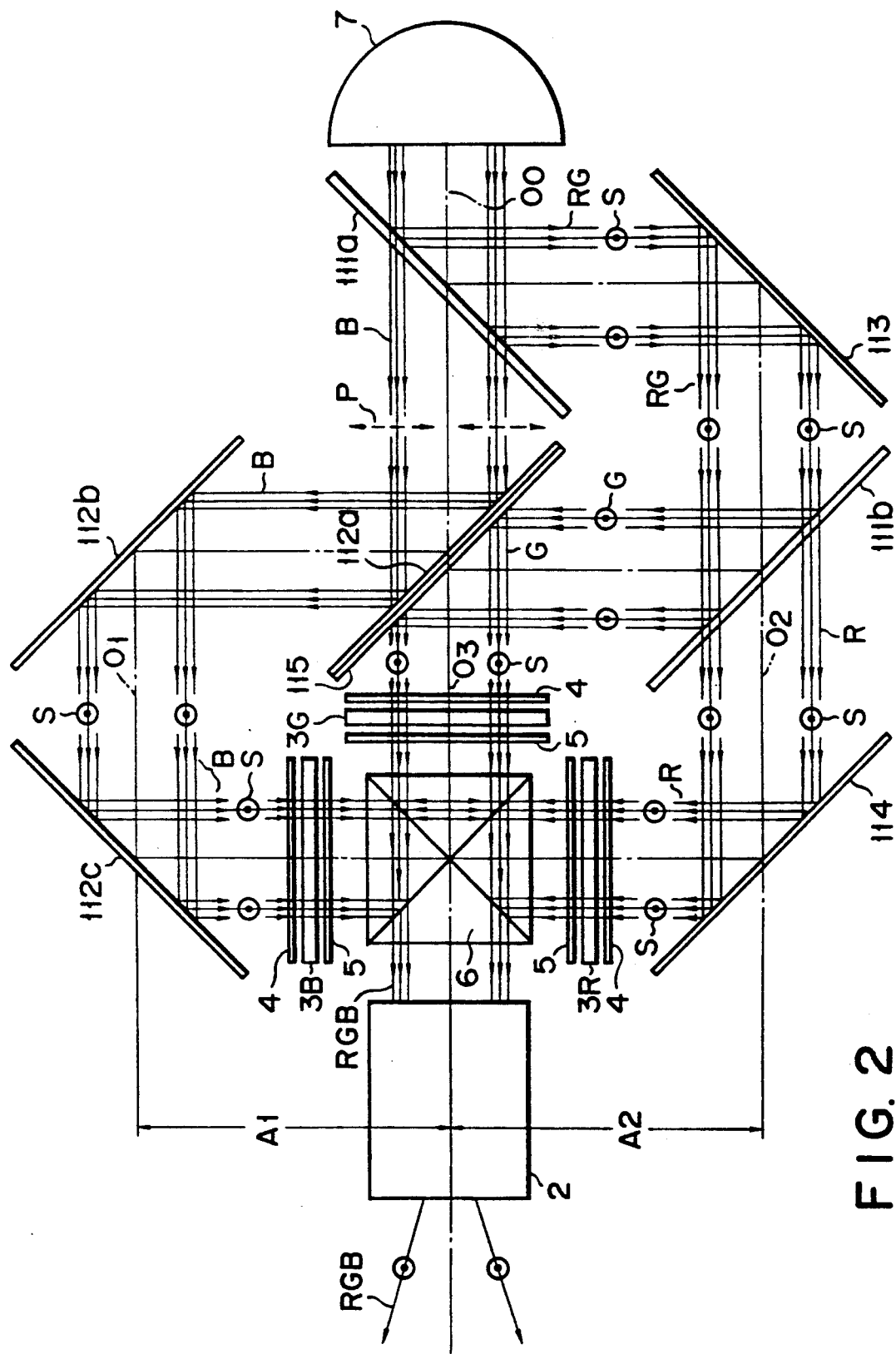

Referring to FIGS. 1 and 2, reference symbol 1A denotes a projection unit. Projection lens 2 is arranged at the front surface of unit 1A. Reference symbols 3R, 3G, and 3B denote three TN type liquid crystal panels each comprising incident light polarizing plate 4 arranged on its incident surface and image forming polarizing plate 5 arranged on its output surface. The liquid crystal in each TN type liquid crystal panel is twisted with respect to the polarization axis direction of polarizing plate 4. In liquid crystal panels 3R, 3G, and 3B, pixel arrangements and aligning directions of liquid crystals are the same. Liquid crystal panels 3R, 3G, and 3B respectively function as a red image display liquid crystal panel for displaying a red image, a green image display liquid crystal panel for displaying a green image, and a blue image display liquid crystal panel for displaying a blue image. Liquid crystal panels 3R, 3G, and 3B respectively display images of red, green, and blue color components constituting a single full-color image. One of liquid crystal panels 3R, 3G, and 3B, e.g., green image display liquid crystal panel 3G, is arranged such that its output surface opposes projection lens 2. The other two liquid crystal panels, i.e., red and blue image display liquid crystal panels 3R and 3B, are arranged at both side surfaces of dichroic prism 6, which is arranged between liquid crystal panel 3G and projection lens 2, such that the output surfaces of liquid crystal panels 3R and 3B oppose each other. In addition, liquid crystal panels 3R, 3G, and 3B are located at the same distance from the center of dichroic prism 6.

Reference numeral 7 denotes a light source for radiating beams onto liquid crystal panels 3R, 3G, and 3B, respectively. Light source 7 is located to oppose green image display liquid crystal panel 3G, which opposes projection lens 2, of liquid crystal panels 3R, 3G, and 3B. Light source 7 comprises a light source lamp and a parabolic mirror reflector for reflecting light from the light source lamp toward liquid crystal panel 3G as a parallel beam.

Reference symbols 111a and 111b denote two dichroic mirrors for separating light (white light from light source 7 into three primary color (red, green, and blue) beams. First dichroic mirror 111a separates a blue beam. Blue beam separating dichroic mirror 111a is arranged between light source 7 and liquid crystal panel 3G so as to be tilted at 45° with respect to the optical axis (to be referred to as a light source optical axis hereinafter) of light radiated from light source 7. Dichroic mirror 111a transmits a beam having a blue color component wavelength and reflects beams having other color component wavelengths, i.e., beams having red and green color component wavelengths.

Of the light from light source 7, blue beam B transmitted through blue beam separating dichroic mirror 111a is reflected by first mirror 112a for reflecting a blue beam in a direction perpendicular to light source optical axis O0 (the optical axis of blue beam B transmitted through polarization axis direction mirror 111a). First mirror 112a is arranged between dichroic mirror 111a and liquid crystal panel 3G so as to be tilted at 45° with respect to light source optical axis O0 and to oppose dichroic mirror 111a at 90°. Second mirror 112b for reflecting a blue beam is arranged at a side of first mirror 112a so as to be parallel thereto. Blue beam B reflected by first mirror 112a is reflected by second mirror 112b in a direction parallel to light source optical axis O0. Blue beam B is further reflected by third mirror 112c for reflecting a blue beam toward blue image display liquid crystal panel 3B. Third mirror 112c is arranged to oppose the incident surface of liquid crystal panel 3B at a tilt angle of 45° and to oppose second mirror 112b at 90°.

Red/green beam RG reflected by blue beam separating dichroic mirror 111a is reflected by red/green beam reflecting mirror 113, which is arranged at the opposite side of second and third mirrors 112b and 112c so as to be opposite and parallel to dichroic mirror 111a, in a direction parallel to light source optical axis O0 and optical axis O1 of blue beam B reflected by second mirror 111b. Red/green beam RG is then incident on second dichroic mirror 111b which is arranged at 45° with respect to optical axis O1 and at 90° with respect to reflecting mirror 113. Second dichroic mirror 111b separates red/green beam RG reflected by dichroic mirror 111a into red and green beams R and G. Red/green beam separating dichroic mirror 111b transmits a beam having a red color component wavelength and reflects beams having other color component wavelengths, i.e., a beam having a green color component wavelength.

Red beam R transmitted through dichroic mirror 111b is reflected by single red beam reflecting mirror 114 toward red image display liquid crystal panel 3R. Reflecting mirror 114 is arranged so as to oppose the incident surface of liquid crystal panel 3R at a tilt angle of 45° and to be parallel to dichroic mirror 111b. Green beam G reflected by dichroic mirror 111b is reflected by single green beam reflecting mirror 115 toward green image display liquid crystal panel 3G. Reflecting mirror 115 is arranged so as to oppose the incident surface of liquid crystal panel 3G at a tilt angle of 45° and to parallelly oppose dichroic mirror 111b.

In this embodiment, green beam reflecting mirror 115 is stacked on blue beam reflecting first mirror 112a back to back. However, reflecting mirror 115 and first mirror 112a may be formed into a single mirror using the two surfaces as reflecting surfaces. If both the mirrors are independently used, they may be set away from each other.

In addition, in this embodiment, reflection enhancing mirrors each having a reflecting surface with a reflection coating or dichroic mirrors are used as mirrors 112a, 112b, 112c, 113, 114, and 115. If the reflection enhancing mirrors are used, their reflectivities can be increased.

If the dichroic mirrors are used as mirrors 112a, 112b, 112c, 113, 114, and 115, each mirror can be designed to reflect a color beam with a slightly narrowed wavelength band and transmit beams having the other wavelength range. If the dichroic mirrors are used as the respective mirrors in this manner, red, green, and blue beams incident on liquid crystal panels 3a, 3G, and 3B can be made closer to the primary colors, respectively.

If reflecting mirror 115 and first mirror 112a, which are arranged back to back, are both dichroic mirrors, light absorbing layers for absorbing transmitted light must be formed on their rear surfaces (between mirrors 115 and 112a if mirrors 115 and 112a are attached to each other back to back).

Reflecting mirror 115 and dichroic mirror 111b are located to satisfy a positional relationship in which optical axis O3 of green beam G reflected by reflecting mirror 115 toward liquid crystal panel 3G coincides with light source optical axis O0. Second and third mirrors 112b and 112c, reflecting mirror 113, dichroic mirror 111b, and reflecting mirror 114 are located at the same distance from light source optical axis O0 so as to allow distance A1 from optical axis O1 of blue beam B reflected by second mirror 112b to optical axis O3 of green beam G reflected by reflecting mirror 115 and distance A2 from optical axis O2 of red beam R transmitted through dichroic mirror 111b to optical axis O3 of green beam G reflected by reflecting mirror 115 to satisfy a relation A1=A2.

Red beam reflecting mirror 114 and blue beam reflecting third mirror 112c are located such that the optical axes of red and blue beams R and B, which are respectively reflected by mirrors 114 and 112c and are transmitted through liquid crystal panels 3R and 3B so as to be incident on image mixing dichroic prism 6, coincide with optical axis O3 of green beam G, which is reflected by reflecting mirror 115 and is transmitted through liquid crystal panel 3G so as to be incident on dichroic prism 6, at the center of dichroic prism 6.

Liquid crystal panels 3R, 3G, and 3B are located at the same distance from the center of dichroic prism 6, as described above, and optical paths are formed so as to bend red, green, and blue beams R, G, and B at a right angle. With this arrangement, optical path lengths of red, green, and blue beams R, G, and B from light source 7 to red, green, and blue image display liquid crystal panels 3R, 3G, and 3B are the same.

In the light input system of liquid crystal panels 3R, 3G, and 3B described above, red beam R of the light from light source 7 is reflected by blue beam separating dichroic mirror 111a and red/green beam reflecting mirror 113 and is transmitted through red/green beam separating dichroic mirror 111b so as to be reflected by red beam reflecting mirror 114 and be incident on red image display liquid crystal panel 3R. Green beam G is reflected by dichroic mirror 111a, reflecting mirror 113, dichroic mirror 111b, and reflecting mirror 115, and is incident on green image display liquid crystal panel 3G. Blue beam B is transmitted through dichroic mirror 111a and is reflected by three reflecting mirrors 112a, 112b, and 112c so as to be incident on blue image display liquid crystal panel 3B. Therefore, all the beams incident on liquid crystal panels 3R, 3G, and 3B have high-intensity S-polarized light components.

More specifically, in blue beam B, for example, its S-polarized light component is attenuated when light is transmitted through dichroic mirror 111a and blue beam B is separated, and hence blue beam B becomes a beam in which the intensity of a P-polarized light component in the P direction shown in FIG. 2 is high. However, since blue beam B is then reflected by three reflecting mirrors 112a, 112b, and 112c and is guided to liquid crystal panel 3B, blue beam B is incident on liquid crystal panel 3B with almost no attenuation of the S-polarized light component. Note that the P-polarized light component of blue beam B is attenuated every time blue beam B is reflected by reflecting mirrors 112a, 112b, and 112c. More specifically, the P-polarized light component of blue beam B is attenuated when blue beam B is reflected by first mirror 112a. As a result, the intensity of the P-polarized light component becomes substantially equal to that of the S-polarized light component. The P-polarized light component is attenuated twice when blue beam B is reflected by second and third mirrors 112b and 112c. That is, blue beam B incident on blue image display liquid crystal panel 3B is a beam which has been transmitted once and reflected three times. Therefore, blue beam B is a beam in which the S-polarized light component is attenuated only once and hence has a high intensity.

This description equally applies to red beam R which is incident on red image display liquid crystal panel 3R. Since red beam R is a beam which has been transmitted once and reflected three times, the S-polarized light component is attenuated only once. Hence, red beam R is a beam in which the intensity of the S-polarized light component is high.

Green beam G incident on green image display liquid crystal panel 3G is a beam which has been reflected four times without being transmitted through any mirror. Therefore, green beam G is a beam in which the S-polarized light component is subjected to almost no attenuation and hence has a high intensity.

In addition, in this light input system, the optical path lengths from light source 7 to liquid crystal panels 3R, 3G, and 3B are set to be equal. With this arrangement, even if light from light source 7 is not perfectly parallel light and diverges to a certain extent upon propagation, the respective color beams incident on liquid crystal panels 3R, 3G, and 3B have substantially the same width of scattering. Therefore, the intensities of the red, blue and green beams which are made incident on the incident-side polarizing plates 4 and 4 of each of liquid crystal panels 3R, 3G, and 3B are approximately the same when its S-polarized component and P-polarized component are summed up.

In liquid crystal panels 3R, 3G, and 3B, the polarization axis directions of polarizing plates 4 are respectively matched with the oscillating directions of the S-polarized light components of red, green, and blue beams R, G, and B. In addition, in each liquid crystal panel, a liquid crystal is twisted at about 90° or 270° with respect to the polarization axis direction of polarizing plate 4. In this case, image forming polarizing plate is arranged in each liquid crystal panel such that the polarization axis direction of polarizing plate 5 is parallel to the polarization axis direction of polarizing plate 4.

That is, liquid crystal panels 3R, 3G, and 3B use S-polarized light components of incident beams as incident beams. As described above, red, green, and blue beams which are respectively incident on liquid crystal panels 3R, 3G, and 3B have high-intensity S-polarized light components and have substantially the same intensity. The beams having these S-polarized light components are respectively transmitted through polarizing plates 4 and are incident on liquid crystal panels 3R, 3G, and 3B. Therefore, beams having high intensities can be caused to be incident on all liquid crystal panels 3R, 3G, and 3B. As a result, all the red, green, and blue image beams which are obtained after the respective beams are transmitted through liquid crystal panels 3R, 3G, and 3B and image forming polarizing plates 5 become image beams having high luminances.

Note that the respective image beams remain the beams having the high-intensity S-polarized light components because the polarization axis directions of image forming polarizing plates 5 of liquid crystal panels 3R, 3G, and 3B are parallel to the polarization axis directions of corresponding incident light polarizing plates 4. The red, green, and blue image beams transmitted through liquid crystal panels 3R, 3G, and 3B and polarizing plates 5 are respectively incident on image mixing dichroic prism 6. Dichroic prism 6 mixes the respective image beams to form a single full-color image beam in which the primary color beams, i.e., red, green, and blue beams R, G, and B are superposed on each other. This full-color image beam is enlarged/projected on screen SC by projection lens 2.

In this case, of the red, green, and blue image beams (beams having the high-intensity S-polarized light components) which are incident on image forming dichroic prism 6, the red and blue image beams are refracted by dichroic prism 6. Hence, dichroic prism 6 outputs the red and blue image beams without substantially attenuating them as in the case wherein beams are reflected by the mirrors. In contrast to this, the green image beam propagating straight through dichroic prism 6 is attenuated as in the case wherein a beam is transmitted through the dichroic mirror. However, green beam G which is incident on green image display liquid crystal panel 3G is a beam which is reflected four times without being transmitted through. The S-polarized component of the green beam at the liquid crystal panel 3G is intensified more than those of red and blue beams at liquid crystal panels 3R and 3B by the amount for one transmission. For this reason, the green image beam emerging from dichroic prism 6 is attenuated in dichroic prism 6 and becomes a beam having substantially the same intensity as the intensities of the red and blue image beams. Therefore, a full-color image beam mixed by dichroic prism 6 becomes an image beam having a good color balance in which the intensities of the red, green, and blue beams are substantially the same.

As described above, according to this projection type liquid crystal projector, light from single light source 7 is separated into the three primary color (red, green, and blue) beams. The respective color beams are incident on three TN type liquid crystal panels 3R, 3G, and 3B. The red, green, and blue beams transmitted through liquid crystal panels 3R, 3G, and 3B are superposed on each other to form a full-color image beam. This full-color image beam is projected on screen SC by projection lens 2. In spite of the above-described arrangement, in this projection type liquid crystal projector, identical liquid crystal panels can be used as three TN type liquid crystal panels 3R, 3G, and 3B, and moreover, a high-quality full-color image beam in which the intensities of red, green, and blue beams are balanced can be projected on screen SC.

In the above-described embodiment, image forming polarizing plates 5 are respectively arranged on the output surfaces of liquid crystal panels 3R, 3G, and 3B. However, only one image forming polarizing plate 5 may be arranged on the output surface of dichroic prism 6 so as to be commonly used to form beams transmitted through liquid crystal panels 3R, 3G, and 3B into image beams. In addition, polarizing plates 5 may be arranged such that their polarization axis directions are substantially perpendicular to those of incident light polarizing plates 4 of liquid crystal panels 3R, 3G, and 3B, respectively. However, if the polarization axis directions of image forming polarizing plates 5 are set to be substantially perpendicular to those of incident light polarizing plates 4, the oscillating directions of beams which are respectively transmitted through polarizing plates 4 and are incident on liquid crystal panels 3R, 3G, and 3B are shifted from those of the image beams which are transmitted through polarizing plates 5 by about 90°. Even in this case, if the respective color beams separated by dichroic mirrors 111a and 111b are caused to be incident on liquid crystal panels 3R, 3G, and 3B by the respective mirrors through the optical paths having substantially the same length as beams in which the intensities of polarized light components in the same direction are high, a high-quality full-color image in which the intensities of red, green, and blue beams are balanced can be projected on screen SC, as in the above embodiment.

Furthermore, in the above embodiment, green image display liquid crystal panel 3G is located to oppose projection lens 2 through dichroic prism 6, and red and blue image display liquid crystal panels 3R and 3B are arranged at both the sides of dichroic prism 6. However, the arrangement of liquid crystal panels 3R, 3G, and 3B is not limited to the one described in the above embodiment. Furthermore, in the above embodiment, the projection type liquid crystal projector for projecting/displaying a full-color image on external screen SC is described. However, the present invention can also be applied to a rear-projection type liquid crystal projector in which a transmission type screen is arranged on the front surface of the projector main body and a full-color image is projected on the screen from its rear surface side (the inside of the projector main body) so that the full-color image projected on the transmission type screen can be viewed from the front surface side of the projector main body.

Since the projection type liquid crystal projector according to the first embodiment of the present invention has the above-described arrangement, in spite of the arrangement wherein light from a single light source is separated into the three primary color (red, green, and blue) beams, a full-color image beam is formed by superposing the red, green, and blue beams which are respectively incident on three TN type liquid crystal panels and are transmitted therethrough, and this full-color image beam is projected on a screen by a projection lens, identical liquid crystal panels can be used as all the three TN type liquid crystal panels, and moreover, a high-quality full-color image beam in which the intensities of red, green, and blue beams are balanced can be projected on the screen.

A rear-projection type liquid crystal projector having first and second characteristic features according to a second embodiment of the present invention will be described below with reference to FIGS. 3 and 4.

Figure 3:
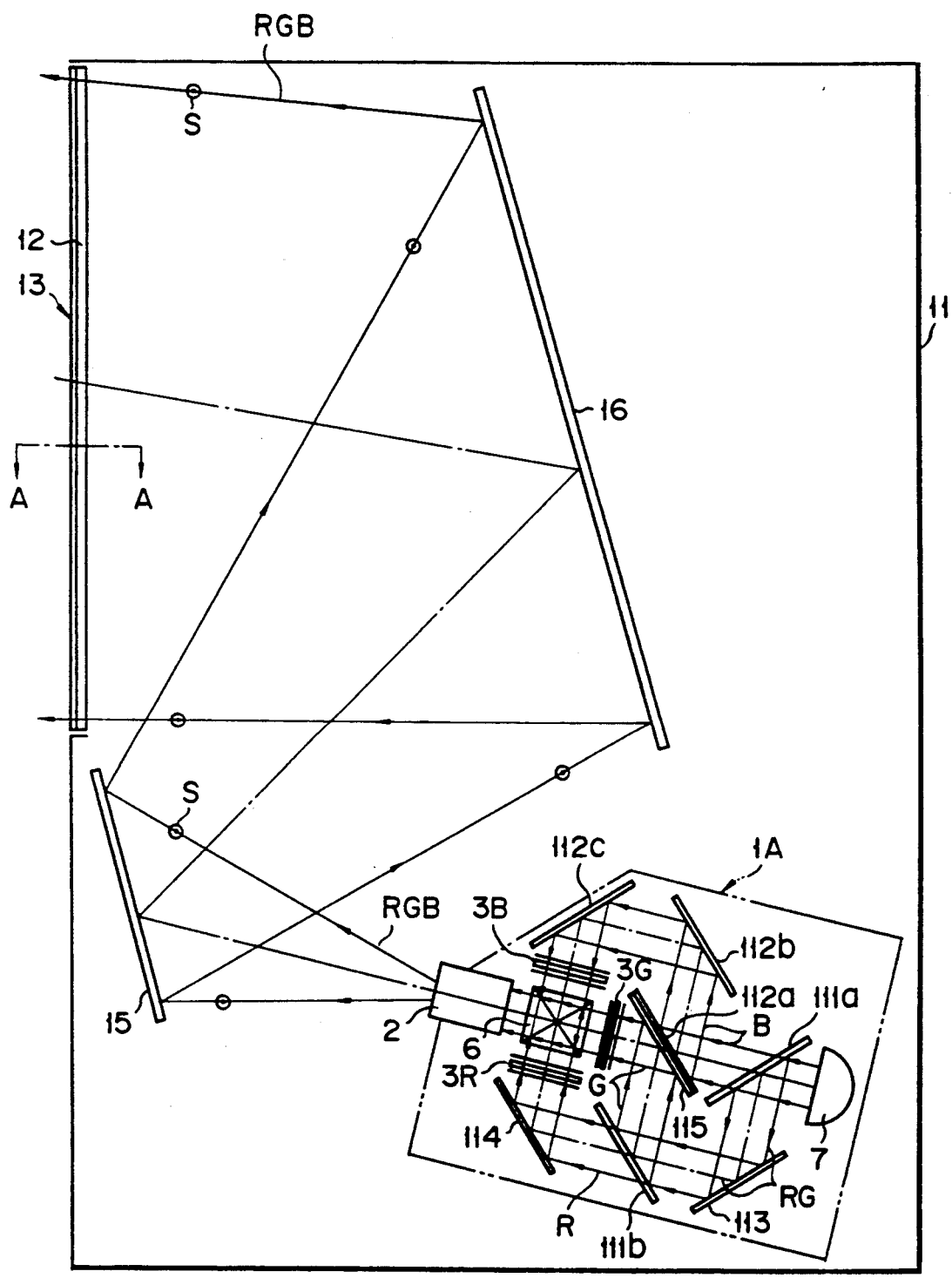
FIG. 3 is a longitudinal sectional view showing a rear-projection type liquid crystal projector according to a second embodiment of the present invention.

FIG. 3 shows an overall arrangement of the rear-projection type liquid crystal projector. FIG. 4 is a partial enlarged sectional view taken along line A—A in FIG. 3.

Figure 4:
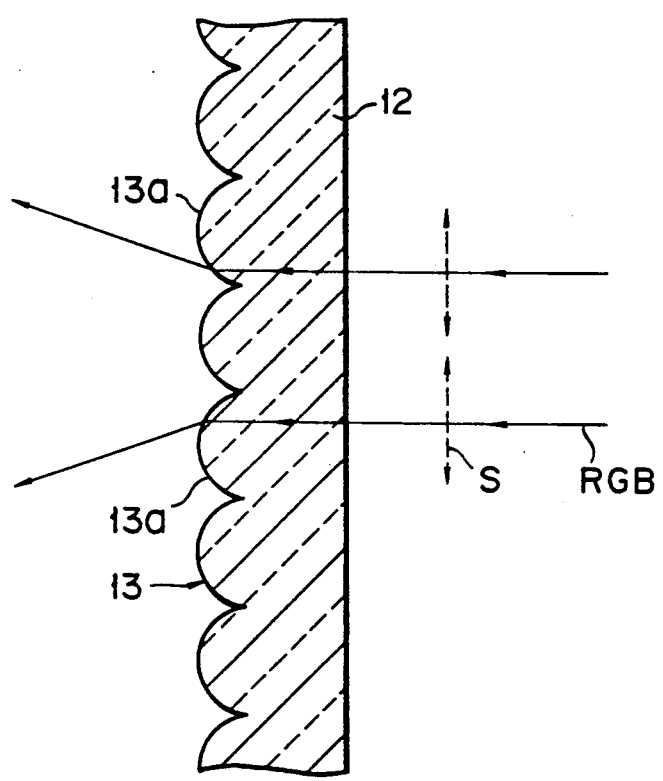
FIG. 4 is an enlarged sectional view taken along line A—A in FIG. 3.
Figure 5:
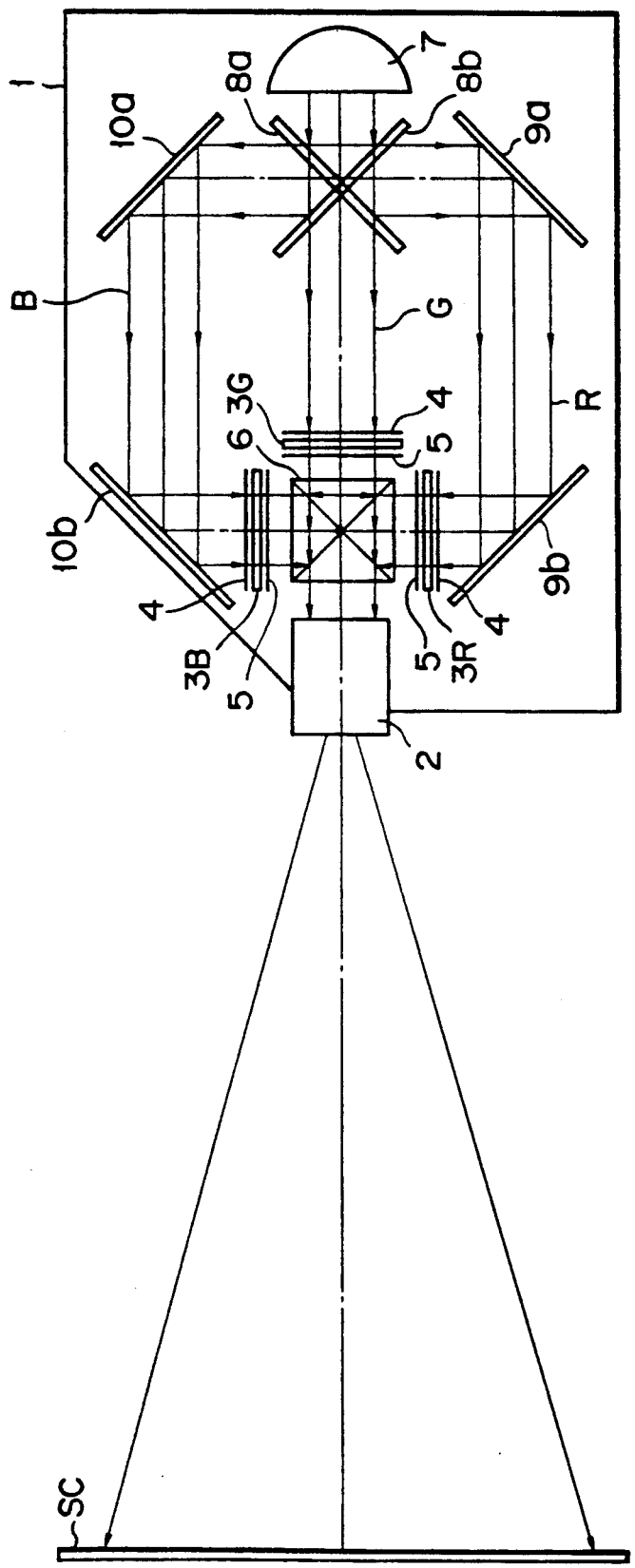
FIG. 5 is a longitudinal sectional view showing a conventional projection type liquid crystal projector.
Figure 6:
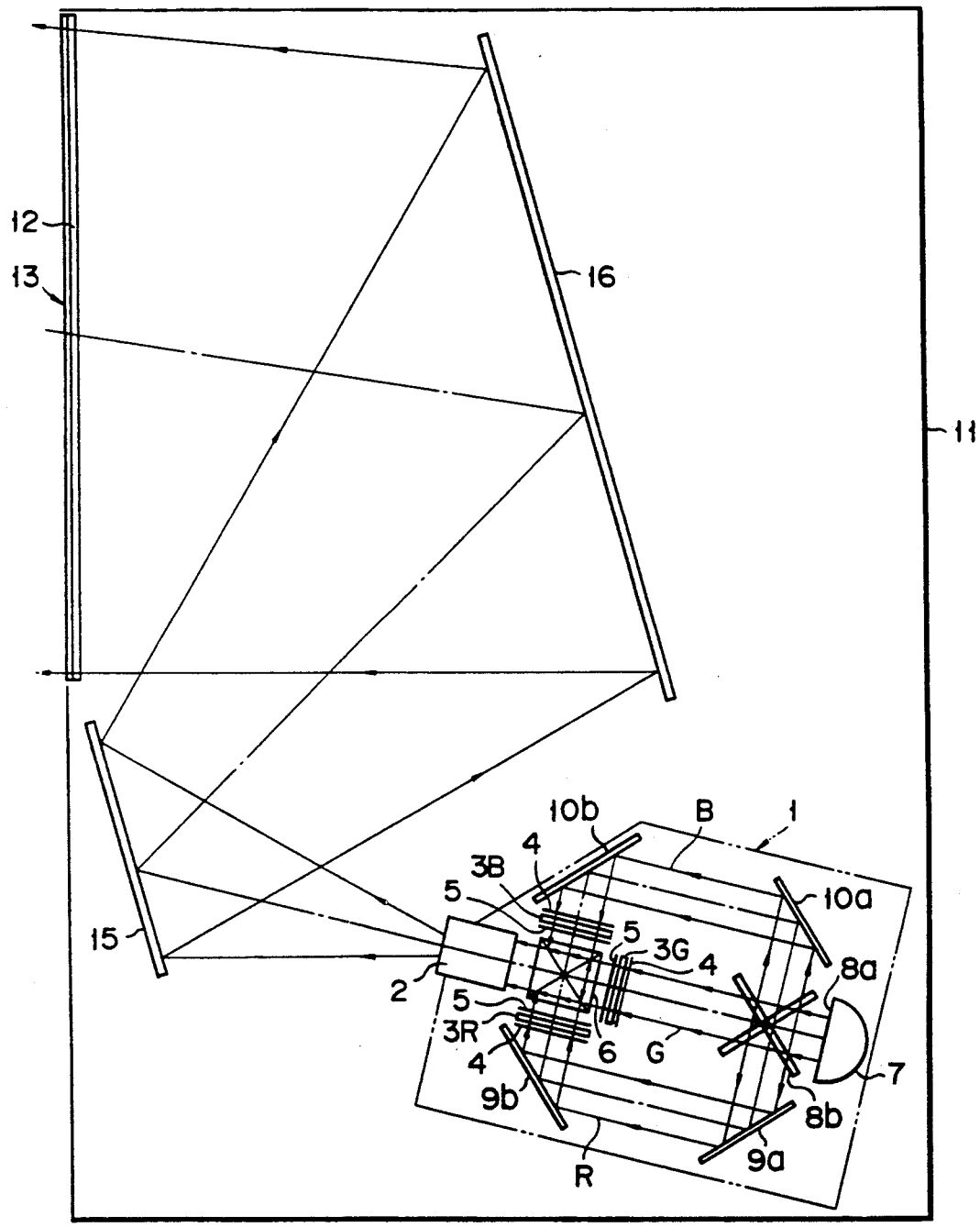
FIG. 6 is a longitudinal sectional view showing a conventional rear-projection type liquid crystal projector.
Figure 1:
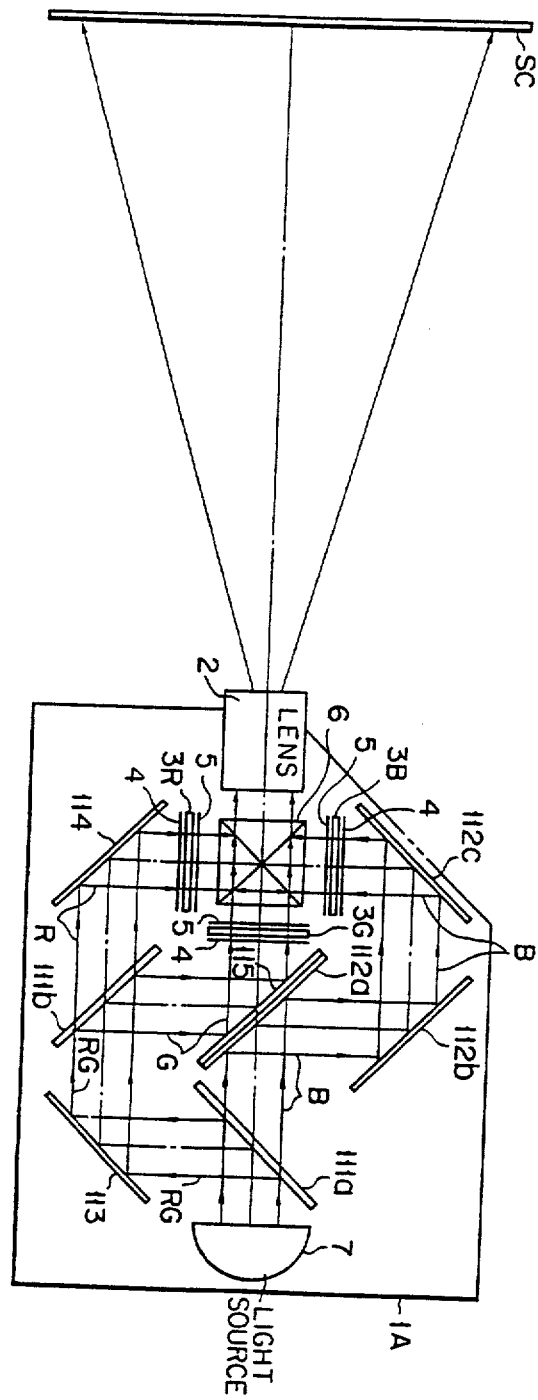
Figure 3:
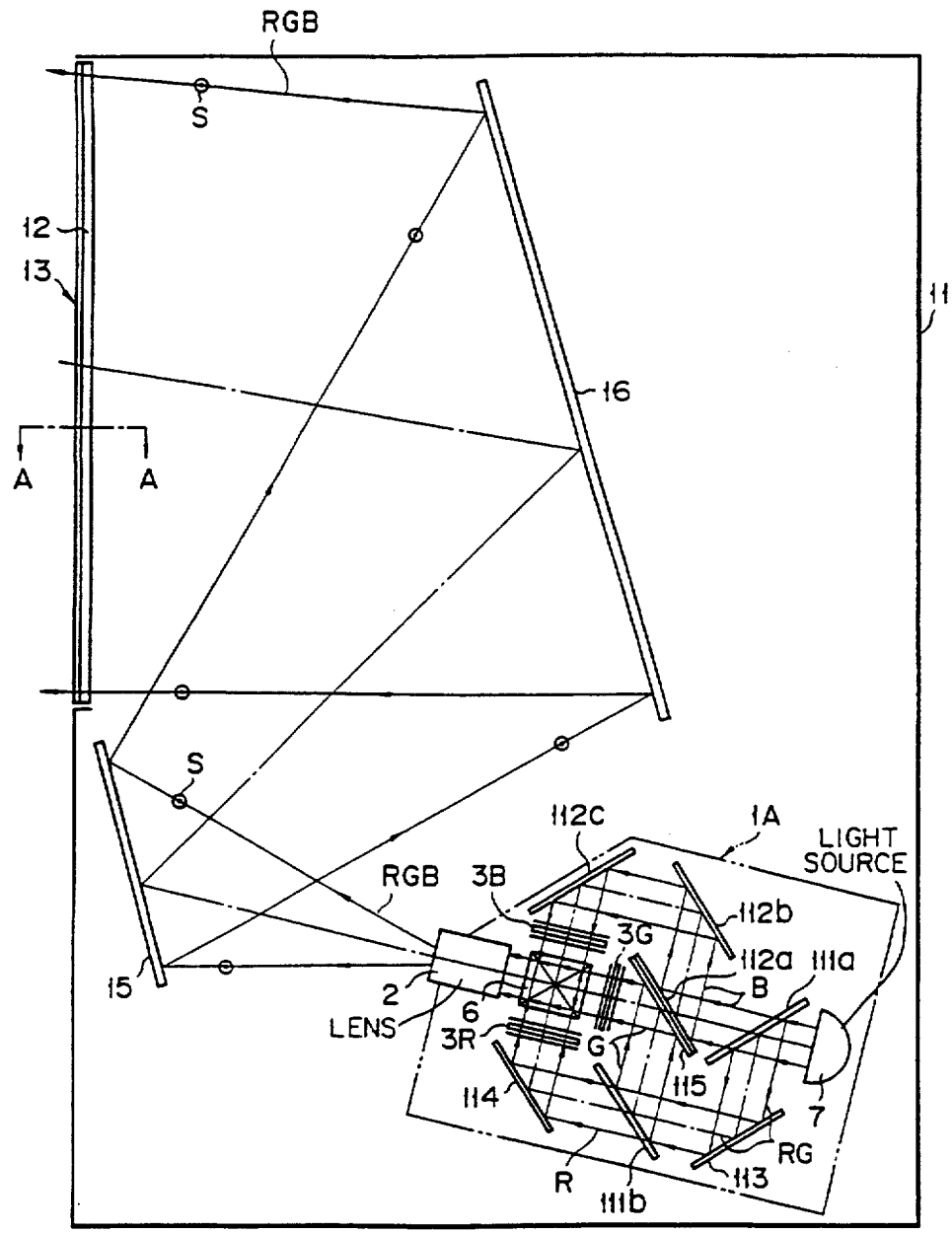
Figure 5:
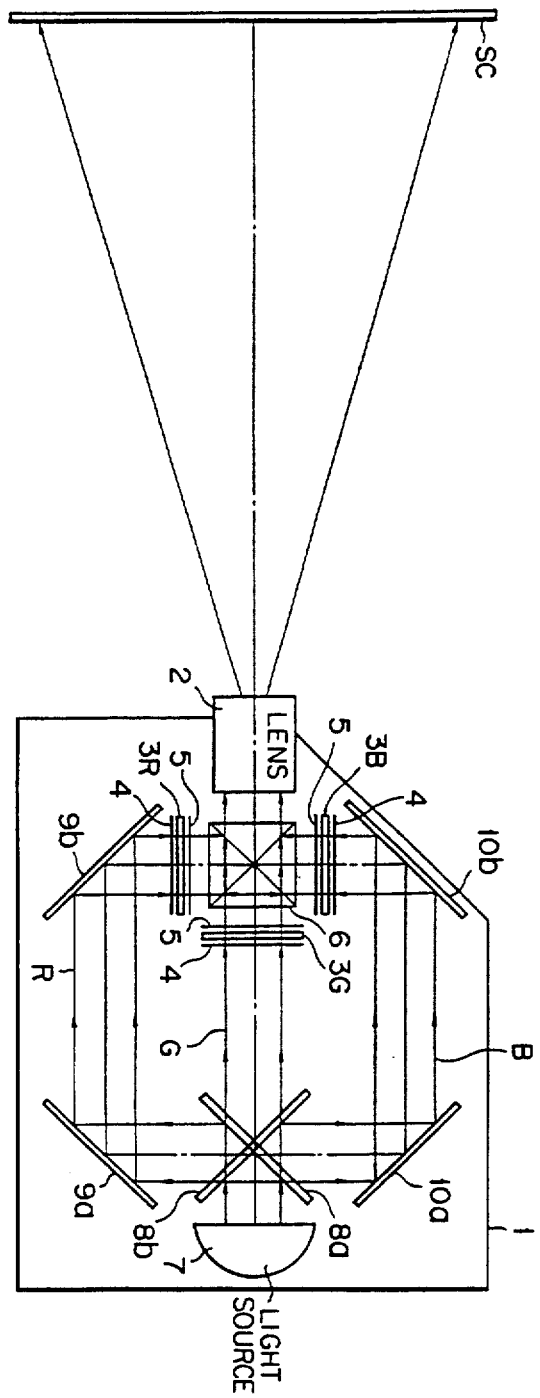
Figure 6:
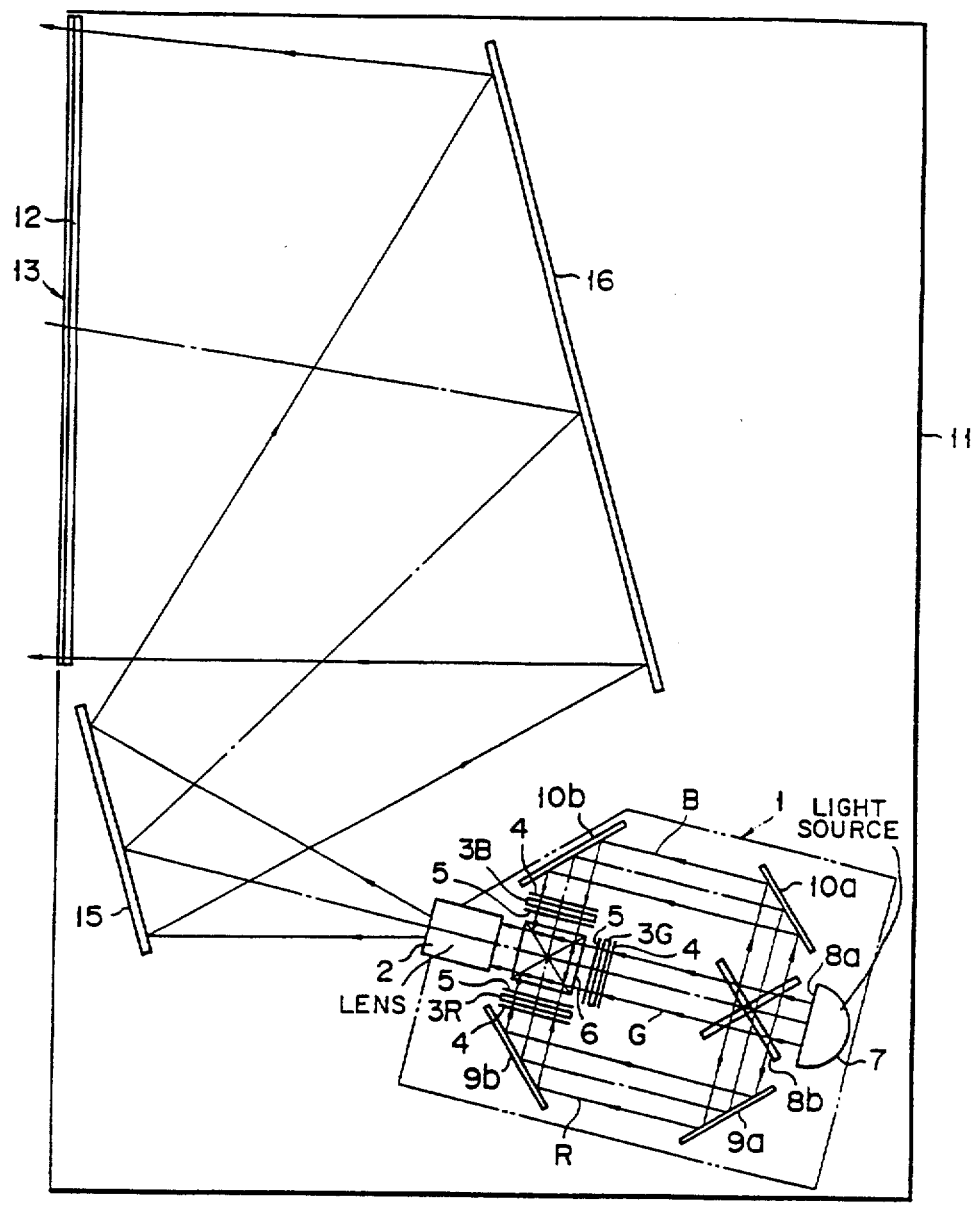

Referring to FIGS. 3 and 4, reference numeral 11 denotes a case of the projector. Transmission type screen 12 having lenticular lens 13 formed on its surface is arranged on a display window formed in the front surface of case 11. Lenticular lens 13 comprises a plurality of stripe lens portions each having a small width. Reference symbol 1A denotes a projection unit equivalent to the projection unit in FIG. 1, which is housed in case 11. Reference numerals 15 and 16 denote projection mirrors. A projection beam (full-color image beam) from projection unit 1A is reflected by first projection mirror 15 toward second projection mirror 16, and is further reflected by second projection mirror 16 toward screen 12 in the same manner as in the conventional rear-projection type liquid crystal display projector shown in FIG. 5.

Note that the optical lengths from light source 7 to liquid crystal panels 3R, 3G, and 3B are set to be substantially the same in projection unit 1A as described above in order to equalize the intensities of red, green, and blue beams. More specifically, if perfectly parallel light is emitted from light source 7, the red, green, and blue beams which are respectively incident on liquid crystal panels 3R, 3G, and 3B have the same intensities as those at the time when the beams are separated by dichroic mirrors 111a and 111b. In practice, however, even if a parabolic mirror reflector is used as light source 7, light from light source 7 is not perfectly parallel light but diverges upon propagation. Hence, the width of a beam is increased as an optical path from light source 7 is elongated. Therefore, if the optical path lengths from light source 7 to liquid crystal panels 3R, 3G, and 3B differ from each other as in the conventional rear-projection type liquid crystal projector, red and blue beams R and G which are respectively incident on red and blue image display liquid crystal panels 3R and 3B having long optical path lengths from light source 7 are increased in beam width compared with green beam G which is incident on green image display liquid crystal panel 3G having a short optical path length from light source 7. As a result, the illuminances per unit area of the beams which are respectively incident on liquid crystal panels 3R and 3B are decreased. This is one of the causes for decreasing the intensities of beams which are respectively incident on liquid crystal panels 3R and 3B. In contrast to this, according to the present invention, since the optical path lengths from light source 7 to liquid crystal panels 3R, 3G, and 3B are set to be equal, the beam widths of the red, green, and blue which are respectively incident on liquid crystal panels 3R, 3G, and 3B are increased to the same extent. Therefore, beams having the same intensity can be incident on liquid crystal panels 3R, 3G, and 3B.

That is to say, the first characteristic feature of this projector will be described below. Projection mirrors 15 and 16 for guiding a full-color image beam projected by projection lens 2 from projection unit 1A toward transmission tape screen 12 arranged on the front surface of case 11 are respectively arranged in case 11 so as to be tilted in a direction perpendicular to the oscillating direction of the full-color image beam (S-polarized beam) transmitted through projection lens 2. This is that projection mirrors 15 and 16 are set at the tilt direction described above so as to efficiently reflect a full-color image beam and to reflect S-polarized beams oscillating in a direction perpendicular to the tilt direction at high reflectivities. If all red, green, and blue beams R, G, and B of the full-color image beam transmitted through projection lens 2 are S-polarized beams, and projection mirrors 15 and 16 are tilted in the above-described manner, all red, green, and blue beams R, G, and B of the full-color image beam are reflected by projection mirrors 15 and 16 in the original oscillating direction without being attenuated. As a result, the full-color image beam which is transmitted through projection lens 2 can be projected on screen 12 as an enlarged full-color image having a good color balance in which the red, green, and blue beams have substantially the same intensity.

The second characteristic feature of this projector will be described below. Lenticular lens 13 formed on the surface of transmission type screen 12 on the front surface of case 11 diffuses an image beam, which is projected on screen 12 from its rear surface side and emerges from its front surface side, so as to expand the viewing angle of an image projected on the screen. As shown in FIGS. 3 and 4, lenticular lens 13 on the screen surface consists of stripe lens portions 13a each having a small width. Lens portions 13a are formed on the screen surface in a direction (vertical in this embodiment) perpendicular to the oscillating direction of an image beam which is transmitted through projection lens 2 and is reflected by projection mirrors 15 and 16 so as to be projected on screen 12. With this arrangement, reflection of an image beam on the surface of lenticular lens 13 can be decreased. The reflectivity of a beam incident on screen 12 becomes minimum at the surface of each lens portion 13a when the beam is a beam oscillating in the widthwise direction (the curved direction of the lens-like surface) of lens portion 13a. Therefore, if lens portions 13a of lenticular lens 13 are formed in the direction perpendicular to the oscillating direction of an image beam reflected by projection mirrors 15 and 16 as described above, the image beam reflected by projection mirrors 15 and 16, i.e., the S-polarized beam, is incident on screen 12 as a beam oscillating in the widthwise direction of each lens portion 13a with respect to lenticular lens 13 on the screen surface, as shown in FIG. 4. Since all red, green, and blue beams R, G, and B of the full-color image beam incident on screen 12 are beams oscillating in the same directions (S-polarized beams), all red, green, and blue beams R, G, and B are transmitted through screen 12 to its front surface side substantially without reflection at the surface of lenticular lens 13. Hence, the resultant full-color image viewed from the front surface side of the projector is an image having a good color balance and a high luminance.

According to the first characteristic feature of this rear-projection type liquid crystal projector, therefore, in spite of the arrangement wherein light from single light source 7 is separated into the three primary color (red, green, and blue) beams and the color beams are respectively caused to be incident on three TN type liquid crystal panels 3R, 3G, and 3B so as to form a full-color image beam by superposing the red, green, and blue beams transmitted through liquid crystal panels 3R, 3G, 3B, so that the full-color image beam is projected on transmission type screen 12 on the front surface of the case by projection lens 2 through projection mirrors 15 and 16, a high-quality image in which the intensities of red, green, and blue beams are balanced can be projected on screen 12.

In the above embodiment, red and blue beams R and B are caused to be incident on red and blue image display liquid crystal panels 3R and 3B after they are reflected three times, whereas green beam G is caused to be incident on green image display liquid crystal panel 3G after it is reflected four times. However, the number of reflection can be arbitrarily set as long as mirrors are arranged to oppose the incident surfaces of liquid crystal panels 3R, 3G, and 3B so as to cause the color beams, which are separated by dichroic mirrors 111a and 111b, to be respectively incident on the corresponding liquid crystal panels as beams in which light components polarized in the same direction have high intensities.

Since the first characteristic feature of the rear-projection type liquid crystal projector according to the second embodiment has the above-described arrangement, in spite of the arrangement wherein light from a single light source is separated into the three primary color (red, green, and blue) beams and the color beams are respectively caused to be incident on three TN type liquid crastal panels so as to form a full-color image beam by superposing the red, green, and blue beams transmitted through liquid crystal panels, so that the full-color image beam is projected on a transmission type screen on the front surface of a case by a projection lens through projection mirrors, a high-quality image in which the intensities of red, green, and blue beams are balanced can be projected on the screen.

According to the second characteristic feature of the rear-projection type liquid crystal projector, in spite of the arrangement wherein light from single light source 7 is separated into the three primary color (red, green, and blue) beams and the color beams are respectively caused to be incident on three TN type liquid crystal panels 3R, 3G, and 3B so as to form a full-color image beam by superposing the red, green, and blue beams which are transmitted through liquid crystal panels 3R, 3G, and 3B, so that the full-color image beam is projected by projection lens 2 on transmission type screen 12 having lenticular lens 13 formed on its surface, the full-color image beam which is transmitted through screen 12 to its front surface side and viewed therefrom can be a high-quality image in which the intensities of red, green, and blue beams are balanced.

In the above embodiment, image forming polarizing plates 5 are respectively arranged on the incident surfaces of liquid crystal panels 3R, 3G, and 3B. However, only one image forming polarizing plate 5 may be arranged on the output surface of dichroic prism 6 so that polarizing plate 5 can be commonly used to form beams, which are respectively transmitted through liquid crystal panels 3R, 3G, and 3B, into image beams. In addition, polarizing plates 5 may be arranged such that their polarization axis directions are set to be substantially perpendicular to the polarization axis directions of incident light polarizing plates 4 of liquid crystal panels 3R, 3G, and 3B. Note that if the polarization axis directions of polarizing plates 5 are set to be substantially perpendicular to the polarization axis directions of polarizing plates 4, the oscillating directions of beams which are respectively transmitted through polarizing plates 4 and incident on liquid crystal panels 3R, 3G, and 3B are shifted from those of the image beams which are transmitted through polarizing plates 5 by about 90°. Even in this case, if the color beams separated by dichroic mirrors 111a and 111b are respectively caused to be incident on liquid crystal panels 3R, 3G, and 3B as beams in which the intensities of polarized light components in the same direction are high, and the longitudinal direction of lens portions 13a of lenticular lens 13 on the screen surface are set to be perpendicular to the oscillating direction of a full-color image beam transmitted through projection lens 2 (the oscillating direction of image beams transmitted through image forming polarizing plate 5), the full-color image transmitted through screen 12 to its front surface side can be a high-quality image in which the intensities of red, green, and blue beams are balanced. Furthermore, in the above embodiment, the rear-projection type liquid crystal projector employing a system of projecting an image beam transmitted through projection lens 2 on screen 12 through projection mirrors 15 and 16 is described. However, the present invention can be applied to a rear-projection type liquid crystal projector employing a system wherein a projection lens is arranged to be directly opposite to a transmission type screen, and directly enlarging/projecting a full-color image transmitted through the projection lens on a screen.

Since the second characteristic feature of the rear-projection type liquid crystal projector according to the second embodiment of the present invention has the above-described arrangement, in spite of the arrangement wherein light from single light source 7 is separated into the three primary color (red, green, and blue) beams and the color beams are respectively caused to be incident on three TN type liquid crystal panels 3R, 3G, and 3B so as to form a full-color image beam by superposing the red, green, and blue beams which are transmitted through liquid crystal panels 3R, 3G, and 3B, so that the full-color image beam is projected by projection lens 2 on transmission type screen 12 having lenticular lens 13 formed on its surface, the full-color image which is transmitted through screen 12 to its front surface side and viewed therefrom can be made a high-quality image in which the intensities of red, green, and blue beams are balanced.

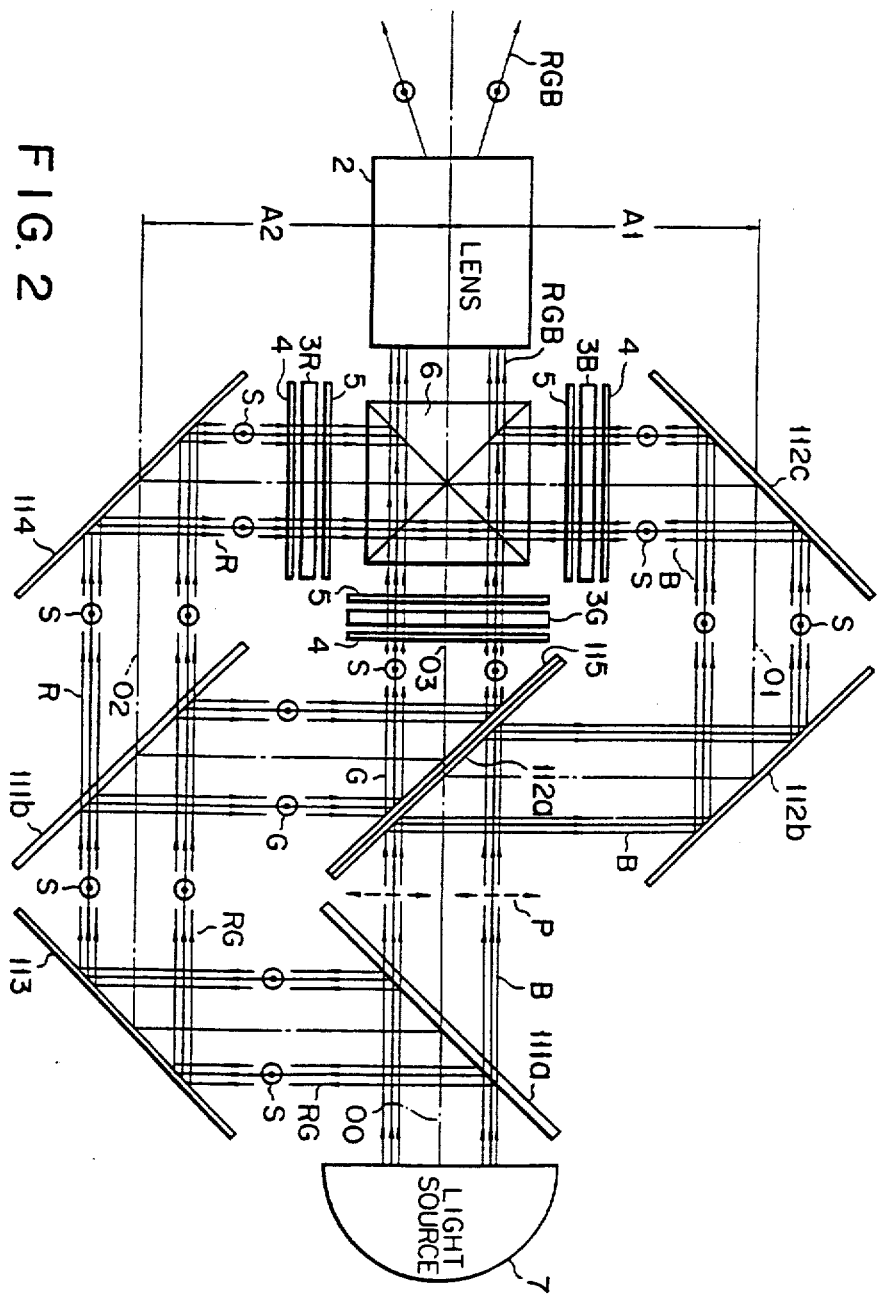

What is claimed is:

1. A liquid crystal projector, comprising:
   first, second and third liquid crystal panels having the same structure;
   a light source;
   a plurality of dichroic mirrors for separating light from light source into three primary color beams, including red, green, and blue beams, and for causing the red, green, and blue beams to be respectively incident on said first, second, and third liquid crystal panels;
   a dichroic prism for superposing the red, green, and blue beams which are transmitted through said liquid crystal panels;
   a projection lens for projecting a full-color image beam formed by said dichroic prism; and
   correcting means including a plurality of mirror means, arranged in light paths between said light source and said first, second and third liquid crystal panels for causing the intensities of the three primary color beams including the red, green, and blue beams to be such that the intensities of light components of the beams oscillating in the same direction with respect to said first to third liquid crystal panels, are all relatively higher than that of light components of the beams oscillating in another direction which is perpendicular to said same direction.

2. A liquid crystal projector, comprising:
three liquid crystal panels having the same structure;
a light source;
optical means for separating a light beam from said light source into three primary light color beams including red, green, and blue beams, for mixing the three primary color beams by causing the three primary beams to be respectively transmitted through said liquid crystal panels, and for outputting a full-color image beam;
a projection lens for projecting the full-color image beam; and
correcting means including a plurality of mirror means, arranged in light paths between said light source and said three liquid crystal panels, for causing the intensities of the three primary color beams including the red, green, and blue beams to be such that the intensities of light components of the beams oscillating in the same direction with respect to said three liquid crystal panels, are all relatively higher than that of light components of the beams oscillating in another direction which is perpendicular to said same direction.

3. A projector according to claim 2, wherein said optical means equalizes the number of reflections of all three separated primary color beams, i.e., red, green, and blue beams and equalizes the number of transmissions of the three primary color beams, i.e., the red, green, and blue beams.

4. A liquid crystal projector, comprising:
three liquid crystal panels having the same structure;
a light source;
optical means for separating a light beam from said light source into three primary light color beams, including red, green, and blue beams, for mixing the three primary color beams by causing the three primary beams to be respectively transmitted through said liquid crystal panels, and for outputting a full-color image beam;
a projection lens for projecting the full-color image beam; and
correcting means including a plurality of mirror means, arranged in light paths between said light source and said three liquid crystal panels, for causing the intensities of the three primary color beams including the red, green, and blue beams to be such that the intensities of light components of the beams oscillating in the same direction with respect to said three liquid crystal panels, are all relatively higher than that of light components of the beams oscillating in another direction which is perpendicular to said same direction;
wherein said optical means equalizes optical path lengths of all three separated primary beams including the red, green, and blue beams, from said light source to said projection lens.

5. A liquid crystal projector comprising:
a light source for emitting three primary color beams including first, second, and third color beams;
a first dichroic mirror for transmitting the first color beam of the three primary color beams emitted from said light source, and reflecting the second and third color beams;
first mirror for reflecting the second and third color beams reflected by said first dichroic mirror in a direction parallel to and the same as the first color beam which is transmitted through said first dichroic mirror;
a second dichroic mirror for transmitting the second color beam of the beams reflected by said first mirror, and reflecting the third color beam in a direction parallel to and opposite to the second and third color beams reflected by said first dichroic mirror;
a second mirror for reflecting the first color beam transmitted through said first dichroic mirror in the same direction as that of the third color beam reflected by said second dichroic mirror;
a third mirror for reflecting the first color beam reflected by said second mirror in a direction parallel to and the same as the first color beam transmitted through said first dichroic mirror;
a fourth mirror for reflecting the first color beam reflected by said third mirror in a direction parallel to and opposite to the first color beam reflected by said second mirror;
a fifth mirror for reflecting the second color beam transmitted through said second dichroic mirror in a direction parallel to and the same as the third color beam reflected by said second dichroic mirror;
a sixth mirror for reflecting the third color beam reflected by said second dichroic mirror in the same direction as that of the first color beam transmitted through said first dichroic mirror;
first to third TN type liquid crystal panels, having the same pixel arrangement and the same liquid crystal alignment, for transmitting the first, second, and third color beams reflected by said fourth, fifth, and sixth mirrors;
a dichroic prism for superposing the first, second, and third color beams which are respectively transmitted through said first to third TN type liquid crystal panels and outputting a full-color image beam; and
a projection lens for projecting the full-color image output from said dichroic prism on an external screen.

6. A projector according to claim 5, wherein the respective beams are reflected by said first and second dichroic mirrors and said first, second, third, and fourth mirrors as beams in which intensities of light components oscillating in the same direction are high.

7. A liquid crystal projector, comprising:
a case;
a transmission type screen arranged on a front surface of said case; and
a projection unit arranged in said case, said projection unit including:
first, second and third liquid crystal panels having the same structure;
a light source;
a plurality of dichroic mirrors for separating light from said light source into three primary color beams including red, green, and blue beams, and for causing the red, green, and blue beams to be respectively incident on said first, second, and third liquid crystal panels;
a dichroic prism for superposing the red, green, and blue beams which are transmitted through said liquid crystal panels;

a projection lens for projecting a full-color image beam formed by said dichroic prism; and correcting means including a plurality of mirror means, arranged in light paths between said light source and said three liquid crystal panels, for causing the intensities of the three primary color beams including the red, green, and blue beams to be such that the intensities of light components of the beams oscillating in the same direction with respect to said three liquid crystal panels, are all relatively higher than that of light components of the beams oscillating in another direction which is perpendicular to said same direction.

8. A projector according to claim 7, wherein a lenticular lens is formed on a surface of said transmission type screen, said lenticular lens comprising a plurality of stripe lens portions which are arranged to be parallel to each other.

9. A projector according to claim 7, further comprising optical means for causing a full-color image beam from said projection lens to be vertically incident on said transmission type screen.

10. A projector according to claim 9, wherein said optical means comprises a mirror.

11. A projector according to claim 10, wherein said mirror reflects as an incident beam a beam in which an intensity of a light component oscillating in the same direction as that of the incident beam is high.

12. A projector according to claim 8, wherein a longitudinal direction of lens portions of said transmission type screen is perpendicular to an oscillating direction of the full-color image beam from said projection lens.

13. A liquid crystal projector, comprising:
a case;
a transmission type screen arranged on a front surface of said case; and
a projection unit including first, second and third liquid crystal panels arranged in said case and having the same structure, a light source, a plurality of dichroic mirrors for separating light from said light source into three primary color beams including red, green, and blue beams, and for causing the red, green, and blue beams to be respectively incident on said first, second, and third liquid crystal panels,
a dichroic prism for superposing the red, green, and blue beams which are transmitted through said liquid crystal panels,
a projection lens for projecting a full-color image beam formed by said dichroic prism; and
optical means for causing the full-color image beam from said projection lens of said projection unit to be one in which the intensities of light components oscillating in the same direction are relatively higher than that of light components of the beams oscillating in another direction which is perpendicular to said same direction, and for causing the beam to be incident on said screen.

14. A projector according to claim 13, wherein said optical means comprises a plurality of mirrors for reflecting the full-color image beam from said projection lens.

15. A projector according to claim 14, wherein all said plurality of mirrors are tilted in a direction perpendicular to an oscillating direction of the full-color image beam from said projection lens.

16. A light crystal projector, comprising:

first to third liquid crystal panels having the same structure, each of said liquid crystal panels including a pair of polarizing plates;
a light source;
a plurality of dichroic mirrors for separating light from the light source into three primary color beams, including red, green, and blue beams, and for causing the beams to be incident on said first to third liquid crystal display panels;
light superposing means for superposing the three primary light beams, including the red, green, and blue beams which have been transmitted through said first to third liquid crystal display panels;
a projection lens for projecting a full-color image beam formed by said light superposing means; and
correcting means, located in light paths between the light source and the incident surfaces of the first to third liquid display crystal panels, for causing the intensities of the three primary color beams, including the red, green, and blue beams, to be such that the intensities of light components of the beams oscillating in the same direction are all relatively higher than that of light components of the beams oscillating in another direction which is perpendicular to said same direction.

17. A liquid crystal projector according to claim 16, wherein said light superposing means equalizes the lengths of the light paths between the light source and said first to third liquid crystal display panels for the three primary color beams including the red, green, and blue beams.

18. A liquid crystal projector, comprising:
a light source;
first to third liquid crystal panels having the same structure, each of said liquid crystal panels including a pair of polarizing plates;
optical means including light separating means for separating light from said light source into three primary color beams including red, green, and blue beams, and mirrors for causing the intensities of the three primary color beams, including the red, green and blue beams to be such that the intensities of light components of the beams polarized in the same direction are all relatively higher than that of light components of the beams oscillating in another direction which is perpendicular to said same direction, and to be incident on said first to third liquid crystal display panels;
light superposing means for superposing the three primary color beams, including the red, green, and blue beams which have been transmitted through said first to third liquid crystal display panels; and
projecting means for projecting a full-color image beam formed by said light superposing means.

19. A liquid crystal projector according to claim 18, wherein said optical means equalizes the lengths of the light paths between the light source and said first to third crystal display panels for the three primary color beams including the red, green, and blue beams.

20. A liquid crystal projector, comprising:
first to third liquid crystal panels having the same structure, each of said liquid crystal panels including a pair of polarizing plates;
a light source;
optical means including a plurality of dichroic mirrors for separating light from the light source into three primary color beams including red, green, and blue beams in which intensities of light components polarized in the same direction are all relatively higher than that of light components of the beams oscillating in another direction which is perpendicular to said same direction;

light superposing means for superposing the three primary color beams, including the red, green, and blue beams which have been transmitted through said first to third liquid crystal display panels; and a projecting lens for projecting a full-color image beam formed by said light superposing means.

21. A liquid crystal projector according to claim 20, wherein said optical means equalizes the number of reflections as well as the number of transmissions of said three primary color beams including red, green and blue beams.

22. A projection system comprising a light source and a color selection system for selecting three color light beams and for passing said beams towards the entrance windows of a color recombination system, in which the light path from the light source to the entrance window is equal for each color light beam and in which the color selecting system comprises a first color-selective mirror for splitting a first color beam and a second color-selective mirror for splitting the remaining beam into a second and a third color light beam, characterized in that the color selection system further comprises a first, a second and a third mirror for passing the first color light beam to the first entrance window, a fourth mirror being arranged in the light path between the first and the second color-selective mirror, a fifth mirror being arranged in the light path of the second color light beam and a sixth mirror being arranged in the third color light beam to the second and the third entrance window, respectively, the first and the fifth mirror being arranged proximate and parallel to each other with their reflective sides remote from each other.

* * * * *

UNITED STATES PATENT AND TRADEMARK OFFICE
CERTIFICATE OF CORRECTION

PATENT NO. : 5,105,265           Page 1 of 6
DATED      : April 14 1992
INVENTOR(S) : SATO et al It is certified that error appears in the above-identified patent and that said Letters Patent is hereby corrected as shown below:

Title page, under Section [30] Foreign Application Priority Data -

Change:   "63-7068" to --63-7068[U]--
                 "63-7069" to --63-7069[U]--.

Replace Figures 1, 2, 3, 5 and 6 with the corrected Figures attached.

Signed and Sealed this

Fourteenth Day of December, 1993

Attest:

BRUCE LEHMAN

*Attesting Officer*      *Commissioner of Patents and Trademarks*